United States Patent [19]

Ivorra

[11] Patent Number: 4,469,086
[45] Date of Patent: Sep. 4, 1984

[54] SOLAR HEATED BUILDING STRUCTURE AND METHOD OF OPERATING A SOLAR-HEAT COLLECTOR SYSTEM

[75] Inventor: Claude Ivorra, Meyzieu, France

[73] Assignee: Phenol Engineering Société À Responsabilitée Limitée, Meyzieu, France

[21] Appl. No.: 478,461

[22] Filed: Mar. 24, 1983

[30] Foreign Application Priority Data

Mar. 24, 1982 [FR] France ............................... 82 05350

[51] Int. Cl.³ ..................... F24H 7/00; E04H 14/00
[52] U.S. Cl. .................................. 126/400; 126/430; 165/96; 165/57; 52/173 R
[58] Field of Search .............. 126/437, 436, 431, 430, 126/400; 52/173 R, 405, 576; 165/96 HV, 57

[56] References Cited

U.S. PATENT DOCUMENTS

| Re. 29,924 | 3/1979 | Becker | 165/49 |
| 3,520,354 | 7/1970 | Lawrence | 165/97 |
| 3,991,531 | 11/1976 | Becker | 52/576 |
| 4,192,454 | 3/1980 | Rugenstein | 126/437 |
| 4,267,822 | 5/1981 | Diamond | 126/431 |

FOREIGN PATENT DOCUMENTS

| 2654732 | 6/1978 | Fed. Rep. of Germany . |
| 7715250 | 5/1977 | France . |
| 8002509 | 8/1981 | France . |
| WO79/00440 | 7/1979 | PCT Int'l Appl. . |
| 948206 | 1/1964 | United Kingdom . |

Primary Examiner—Samuel Scott
Assistant Examiner—G. Anderson
Attorney, Agent, or Firm—Karl F. Ross; Herbert Dubno

[57] ABSTRACT

A building having rooms to be heated is supported at least in part on a cylindrical double wall concrete tank, the inner wall of which receives a heating fluid preferably heated by a solar collector while the outer wall includes a coil through which the heated fluid can be circulated to radiate heat into the rooms of the building.

8 Claims, 2 Drawing Figures

SOLAR HEATED BUILDING STRUCTURE AND METHOD OF OPERATING A SOLAR-HEAT COLLECTOR SYSTEM

CROSS REFERENCE TO RELATED APPLICATION

This application is related to my concurrently filed commonly owned copending application Ser. No. 478,460, 24 Mar. 1983.

FIELD OF THE INVENTION

My present invention relates to a method of storing and recovering thermal energy and especially to a solar energy recovery and utilization method. The invention also relates to an apparatus for carrying out the method of the present invention and, more particularly, to a solar heated building structure employing the method of the invention.

BACKGROUND OF THE INVENTION

In printed French application No. 2,456,175, corresponding to a French application 79 12518 of 10 May 1979 commonly owned with the present application, there is described a system in which solar heating systems can be integrated into a building structures so as to transfer thermal energy to the heatable space therein.

This system combines economically the usual elements of construction with those required for cooperation with a system for the storage and utilization of thermal energy in which a heat carrier such as a liquid is stored in a tank.

In this document, the tanks or storage reservoirs are of cylindrical configuration with vertical axes and are connected in a heating circuit, the tanks forming support piles or foundation elements for the structure.

To ensure a maximum carrying capacity, the cylindrical tanks are generally practically completely filled with the hydraulic fluid which may also constitute the heat carrier.

The heating fluid can be piped from these tanks throughout the building for space heating purposes.

The thermal storage and recovery system described in that publication thus represents an advance over systems in which the several storage tanks are merely parasitic with respect to the building structure and may even contribute a drain upon the foundation requirements and the like.

OBJECTS OF THE INVENTION

The principal object of the present invention is to provide a method of and a device for the recovery of solar energy and its use in a building for space heating purposes, whereby the principles of the aforedescribed system are advanced and the thermal storage and recovery is rendered even more efficient.

Another object of this invention is to provide an improved method of storing and recovering thermal energy whereby undesired losses of thermal energy are minimized, building construction utilizing solar energy recovery is simplified and the cost of a solar recovery unit can be reduced by comparison with earlier systems.

SUMMARY OF THE INVENTION

These objects and others which will become apparent hereinafter are attained in accordance with the present invention, in a solar energy recovery system which comprises, for a building and especially a habitable building, a cylindrical energy-storage tank which forms a support for the structure and has surfaces in direct heat exchanging relationship with dwelling spaces within this structure.

According to the invention, the tank is provided with a double-wall construction, including an inner wall of cylindrical configuration, an outer wall of cylindrical configuration surrounding the inner wall, and a zone of thermal insulation between these walls. According to the invention, the solar collectors on the building and particularly on the roof of the building (forming the preferred heating means for the stored liquid) are connected in a fluid circuit with the tank defined by the inner wall and enclosed thereby to transfer solar energy in the form of a temperature increase in the fluid, to the liquid practically filling this inner tank.

The outer concrete wall of the cylindrical tank is formed with means permitting the circulation therethrough of the thermal fluid, generally water, from the tank so that it forms a radiator or thermal transfer structure directly transferring heat into the habitable spaces of the building surrounding this wall of the tank which thereby serves as the sole space heater of the structure.

The dwelling spaces of the building, which surrounds this tank by virtue of the fact that the tank can rise within the building and have its walls in heat exchanging relationship with numerous dwelling spaces within the building carried by the tank, are therefore directly heated by the radiant energy from the outer wall of the tank at a rate which is a function of the rate at which the heating fluid is circulated through this wall and, of course, the temperature of this fluid.

Thus one and the same element, namely, the tank or reservoir, connected for example to the solar collector, serves simultaneously the functions of storing the thermal energy or calories absorbed by the fluid in the solar collector, and as a heat exchanger permitting transfer of these calories by the fluid directly to the spaces of the building to be heated.

Preferably this tank or reservoir also fulfills the third function of stabilizing or supporting the building, advantageously by supporting the structural elements upon which the building spaces are mounted.

According to another aspect of the invention, I provide a building support element essentially in the form of a cylindrical tank with a vertical axis and having an inner concrete wall and an outer concrete wall separated from one another by an insulating core, the inner concrete wall delimiting a storage volume for a heating fluid connected to a heating circuit. Preferably this heating circuit is a solar collector.

The external concrete wall is provided with at least one pipe system, preferably in the form of a serpentine or helical pipe coil, for transfer of the thermal energy stored within the inner wall, the ends of this pipe system being connected to the interior of the storage volume and the pipe system is associated with control means for regulating the circulation of heating fluid from within the tank through the helical coil and thus into heat exchanging relationship with the building spaces via the outer concrete wall.

The heating coil, which can be connected at its ends to the top and bottom of the body of liquid within the tank, thus plays an active role in heating the spaces surrounding the tank while the tank itself plays the passive role of accumulating thermal energy. Because of the insulated layer between the two walls and the fact that the outer wall may be heated by the coil, the thermal differential across the tank wall is minimized and thus thermal losses are minimized. If such losses through the walls do occur, they serve to increase the heat transfer to the surrounding space and thus even heat losses are utilized in accordance with this invention.

While it is possible to utilize a single tank to support a building, in accordance with the present invention, it is also possible, in the case of larger structures, to utilize a number of such tanks in spaced apart relationship to provide support for the building at a number of locations. In each case, of course, the building spaces, i.e. the habitable spaces or rooms of the building, should at least in part surround the tanks.

Because of the layer of insulation between the two walls of the tank, even while the tank serves to deliver the heating fluid to the coil to allow the outer layer of concrete to serve as a radiator, the body of liquid within the inner concrete layer can serve to collect and accumulate thermal energy. Since the tank can remain practically full of liquid, it provides a hydraulic contribution to the stability of the tank and the building.

The transfer of thermal energy to the building spaces can be controlled and regulated simply by varying the volume rate of flow of the circulated fluid in one or more helical coils of tubes or pipes provided in the external concrete wall.

Where the insulating layer between the concrete walls is in part a vacuum-type or evacuated-space insulation, preferably provided with evacuatable cells, I can also control the thermal energy radiated to the exterior at least in part by varying the effectiveness of the insulation by varying the degree of vacuum within the space between the two concrete walls. As described in the aforementioned application, I may intentionally force fluid under pressure into this space to provide thermal coupling between the inner and outer walls.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
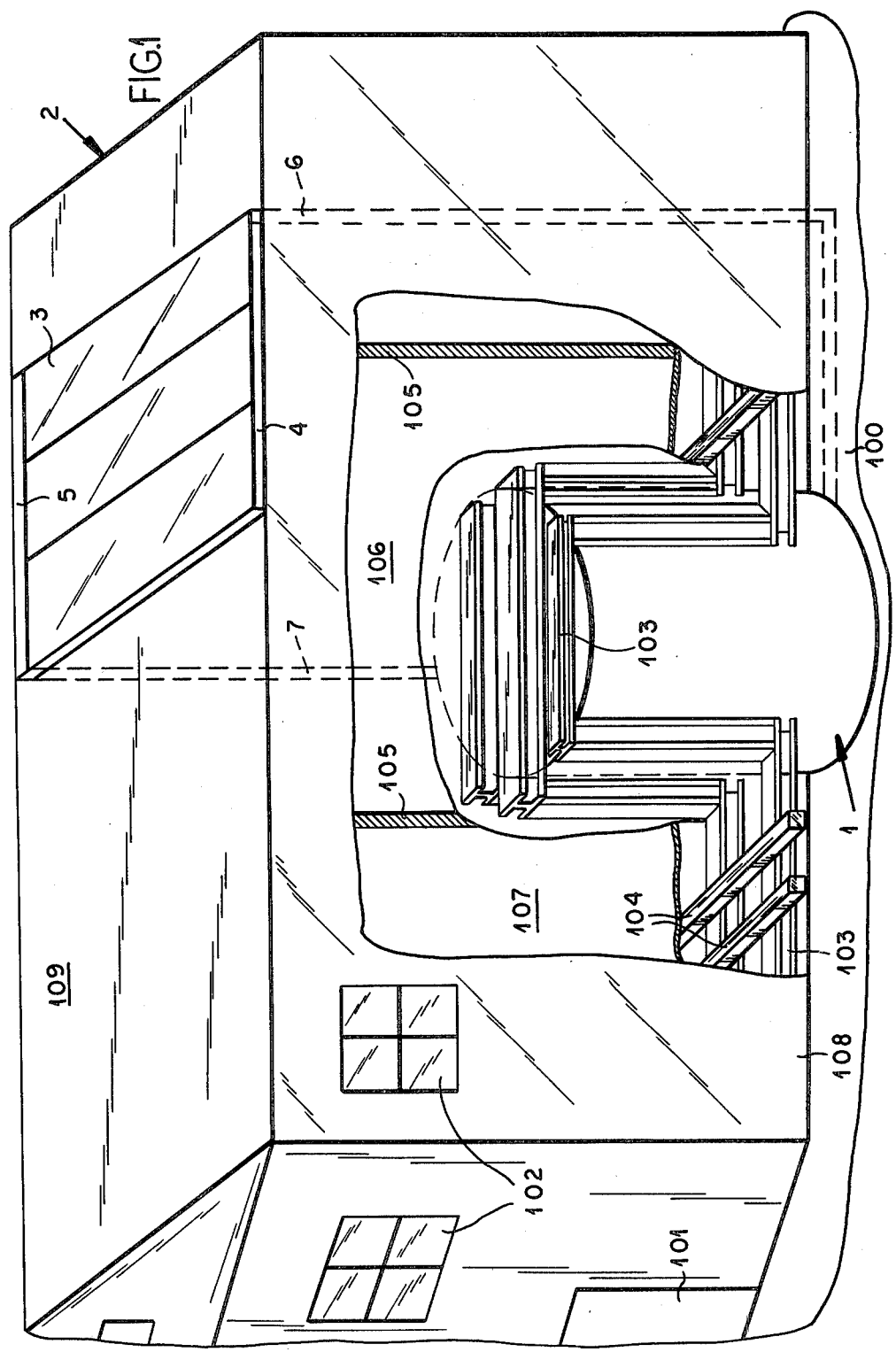
FIG. 1 is a perspective view, partly broken away, showing a building of solar heated design embodying the system of the present invention is highly diagrammatic form.

As shown in FIG. 1, the system of the present invention basically comprises a cylindrical tank 1 which can be disposed upon the ground 100 or can be partly recessed therein with an appropriate footing to serve as a foundation pile or even as the sole support for the building 2.

The building 2 is provided with a plurality of horizontal supports 103 which are carried by the tank 1 and can also support floor joists 104 upon which the floor of rooms or other spaces 107 to be heated of the building are provided. The supports 103 overlying the tank may also form joists for a floor for a second level of a room 106, for example. The spaces within the building can be separated from one another by the usual walls 105 and surround the tank 1 so as to be heated from the external wall thereof as will be described in greater detail subsequently.

The solar collector 3 can be provided on the roof 109 of the building which can have the door 101, the usual windows 102 and external walls 108 as is common in dwellings. An apron can run from the walls 108 to the ground.

A lower manifold 4 can be provided for the solar collector 3 while an upper manifold 5 is also provided. A first conduit 6 running from the lower manifold 4 to the bottom of the tank 1 and another pipe 7 running from the upper manifold 5 to the top of the tank provide a circulation allowing transfer of solar energy, transformed into an increase in temperature of the circulated water, from the solar collector 3 into the tank.

The tank thus constitutes a device for storing thermal energy and from which thermal energy can be transferred to the dwelling spaces of the building.

Figure 2:
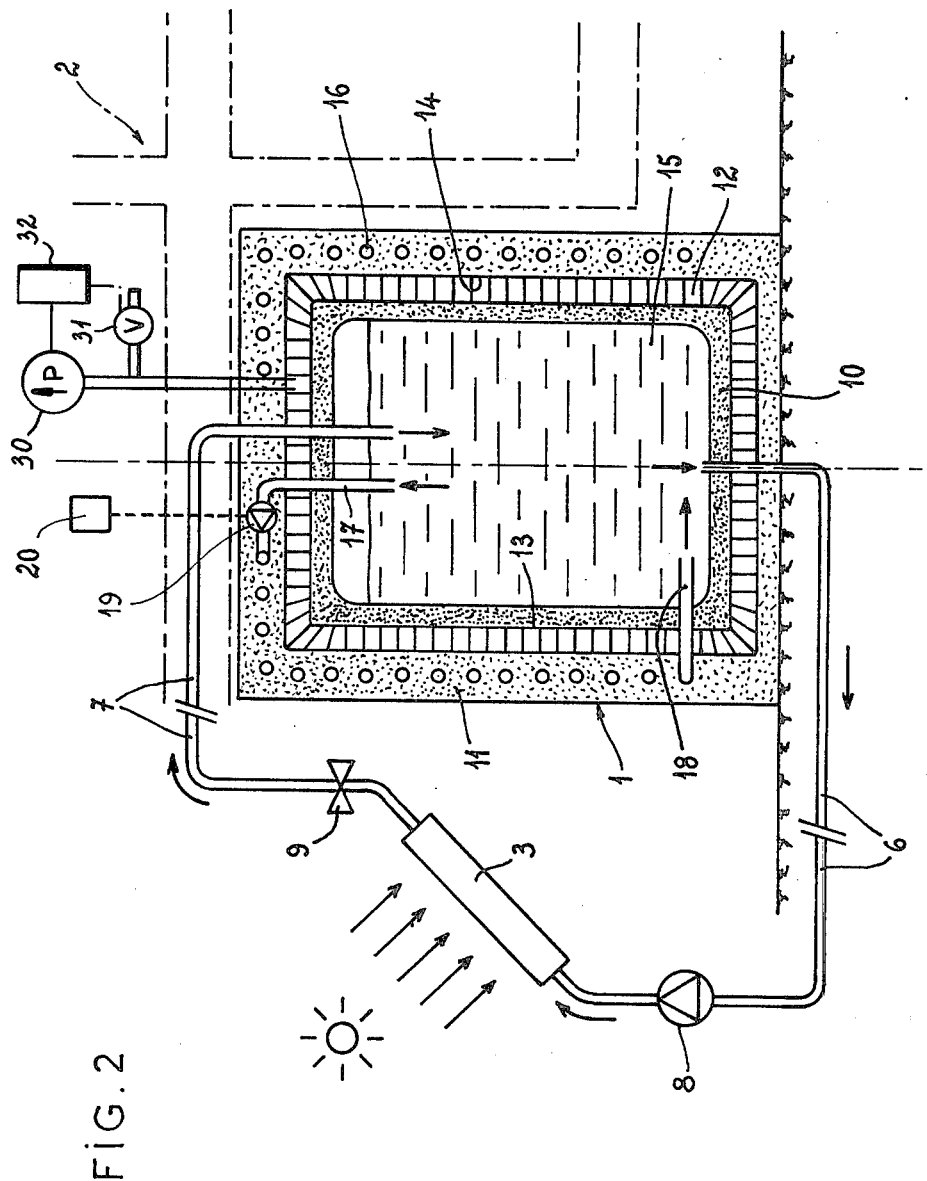
FIG. 2 is a diagrammatic vertical section through a tank for use in the method of the present invention.

As can be seen from FIG. 2, the solar circulation can include a circulating pump 8 and a check valve 9 ensuring unidirectional flow of water through the solar collector.

The tank 1 is constituted by two coaxial concrete walls, namely, an interior concrete wall 10 and an exterior concrete wall 11 separated by an insulating space 12.

The insulating space may be a honeycomb or other cellular structure which can be evacuated by a pump 30 or vented by a valve 31 to the atmosphere under the control of a temperature sensor 32.

Thus, in the event of a failure of the heat exchange circulation, space heating may be maintained by decreasing the vacuum of the layer 12 and thereby allowing leakage of heat from the interior of the tank to the exterior thereof.

Alternatively, the variable-effectiveness insulation 12 can be utilized to supplement the radiant heating supplied by the heat exchange coil.

The evacuated space containing the honeycomb 12 is delimited by a cylindrical inner foil 13 and a cylindrical outer foil 14 which can be sealed together to prevent leakage of vacuum from the evacuated space.

The inner concrete wall 10 delimits a storage volume containing the fluid 15, i.e. hot water.

The pipe 6 communicates with a low point of the interior of this tank to deliver the thermal liquid to the solar collector 3 while the pipe 7 opens at the top of the volume of liquid within the tank to deliver the heated liquid thereto.

In the external concrete wall 11, a serpentine or helical coil 16 of at least one pipe is provided. The inlet of this pipe comprises a riser 17 reaching into the top of the liquid within the tank. The riser 17 is connected with the coil by a pump 19 under control of a thermal sensor 20.

At its opposite end, the coil is provided with an outlet 18 into the lower portion of the tank.

When the temperature sensor 20 detects a drop in the temperature in the room in which the sensor is provided, the pump 19 is started to circulate the stored hot liquid within the tank through the coil 16 thereby heating the exterior wall 11 of the tank and permitting the latter to radiate heat into the living spaces.

The tank 1 thus comprises an accumulator of heat utilizing the heat carrying fluid 15 heated by the solar collector 3 and stored within the space defined by the inner wall 10.

The storage of thermal energy is assured by the insulation which surrounds this inner tank.

For use of this stored thermal energy, the pump 19 can be started or the insulating effectiveness of the space 12 can be reduced, as described, to radiate heat from the wall 11 which is irrigated by the thermal liquid through the coil 16, or which simply passes by conduction of thermal energy traversing the insulating space when the insulating effectiveness of this space is reduced by connecting this space with the atmosphere via valve 31 for example.

Obviously the invention is not limited to the embodiment described but also includes modifications within the spirit and scope of the appended claims. For example, other fluids can be used as the thermal storage fluid within the tank and as the heat exchange fluid circulating through the outer wall of the tank. The fluid can be a liquid or gas. The fluid is preferably heated by solar energy although other heating means can be used and, indeed, other heating means can be used as an accessory to the solar heating.

While one tank has been shown in the center of the building 2 in FIG. 1, obviously a plurality of such tanks can be utilized in the manner of piles for supporting the building. However, when a plurality of such tanks are used, in accordance with the present invention, it is preferred to have each of them extend at least in part into the building so that they have radiant heating surfaces all around each tank to transfer heat to the dwelling spaces surrounding the piles.

I claim:

1. A method of operating a heating system for a building having at least one space to be heated, said method comprising the steps of:
    (a) storing heat in a heating fluid in a double-wall tank having an inner wall defining a storage volume for said fluid, and an outer wall surrounding said inner wall and in heat exchanging relationship with said space;
    (b) insulating said walls from one another to limit direct heat exchange between said walls;
    (c) heating said space by circulating said fluid through said outer wall whereby said outer wall radiates said heat into said space; and
    (d) varying the degree of insulation between said walls in response to thermal requirements of said space, thereby enabling at least some direct transfer of heat from the interior of said tank through said walls to said space.

2. The method defined in claim 1, further comprising the step of supporting said building at least in part on said tank.

3. The method defined in claim 1, further comprising heating the fluid in said tank by passing it through a solar collector.

4. The method defined in claim 2, further comprising heating the fluid in said tank by passing it through a solar collector.

5. A method of operating a heating system for a building having at least one space to be heated, said method comprising the steps of:
    (a) storing heat in a heating fluid in a double-wall tank having an inner wall defining a storage volume for said fluid, and an outer wall surrounding said inner wall and in heat exchanging relationship with said space;
    (b) insulating said walls from one another to limit direct heat exchange between said walls;
    (c) heating said space by circulating said fluid through said outer wall whereby said outer wall radiates said heat into said space;
    (d) supporting said building at least in part on said tank;
    (e) heating the fluid in said tank by passing it through a solar collector; and
    (f) varying the degree of insulation between said wall in response to thermal requirements of said space, thereby enabling at least some direct transfer of heat from the interior of said tank through said walls to said space.

6. A heating system for a building having at least one space to be heated by said system, said system comrising:
    a cylindrical tank having a vertical axis and formed with an inner concrete wall defining a storage volume, an outer concrete wall surrounding said inner concrete wall and in heat exchanging relationship with said space, and insulating means between said walls for limiting the direct transfer of heat from said inner wall to said outer wall;
    heating means for raising the temperature of a fluid connected to said tank for enabling the storage of said fluid in said volume; and
    means for circulating fluid drawn from said volume through said outer wall thereby heating the said space, said means for circulating said fluid including at least one tube coil embedded in said outer wall and having an inlet and an outlet opening into said volume, a pump connected to said tube coil and a temperature sensor responsive to said temperature in said space for controlling said pump, said inlet opening at the top of said volume and said outlet opening at the bottom of said volume, said heating means including a solar collector on said building and means for circulating said fluid through said solar collector, said tank being the sole support for said building and being disposed centrally thereof, said insulating means being an evacuatable cellular structure, and is provided with means responsive to the temperature in said space for controlling the degree of evacuation of said cellular structure to enable direct heat transfer from said inner wall to said outer wall.

7. The system defined in claim 6 wherein said means for circulating said fluid includes at least one tube coil embedded in said outer wall and having an inlet and an outlet opening into said volume.

8. The system defined in claim 6 wherein said cellular structure is defined between two sealing foils.

* * * * *